United States Patent
Chen et al.

(10) Patent No.: US 11,256,685 B2
(45) Date of Patent: Feb. 22, 2022

(54) REMOVING WILDCARD TOKENS FROM A SET OF WILDCARD TOKENS FOR A SEARCH QUERY

(71) Applicant: ENTIT SOFTWARE LLC, Sanford, NC (US)

(72) Inventors: Qiming Chen, Sunnyvale, CA (US); Meichun Hsu, Sunnyvale, CA (US); Malu G. Castellanos, Sunnyvale, CA (US)

(73) Assignee: Micro Focus LLC, Santa Clara, CA (US)

( * ) Notice: Subject to any disclaimer, the term of this patent is extended or adjusted under 35 U.S.C. 154(b) by 295 days.

(21) Appl. No.: 16/092,522

(22) PCT Filed: Apr. 15, 2016

(86) PCT No.: PCT/US2016/027822
§ 371 (c)(1),
(2) Date: Oct. 10, 2018

(87) PCT Pub. No.: WO2017/180153
PCT Pub. Date: Oct. 19, 2017

(65) Prior Publication Data
US 2019/0163674 A1 May 30, 2019

(51) Int. Cl.
*G06F 16/00* (2019.01)
*G06F 16/242* (2019.01)
*G06F 16/33* (2019.01)

(52) U.S. Cl.
CPC ........ *G06F 16/242* (2019.01); *G06F 16/3335* (2019.01)

(58) Field of Classification Search
None
See application file for complete search history.

(56) References Cited

U.S. PATENT DOCUMENTS

| | | |
|---|---|---|
| 5,303,150 A | 4/1994 | Kameda |
| 6,556,990 B1 | 4/2003 | Lane |
| 6,785,677 B1 | 8/2004 | Fritchman |

(Continued)

FOREIGN PATENT DOCUMENTS

| | | |
|---|---|---|
| CN | 103390004 A | 11/2013 |
| CN | 103902600 A | 7/2014 |
| WO | WO-2006111936 A3 | 3/2007 |

OTHER PUBLICATIONS

Method and System for Implementing a Wildcard Search Engine, ip.com (Year: 2019).*

(Continued)

*Primary Examiner* — Jean M Corrielus

(57) ABSTRACT

In one example in accordance with the present disclosure, a method may include separating a list of keywords into a set of word tokens and a set of wildcard tokens. The method may also include removing each wildcard token in the set of wildcard tokens that is inferred by at least one word token in the set of word tokens and removing each wildcard token in the set of wildcard tokens that is inferred by at least one other wildcard token in the set of wildcard tokens. The method may also include executing a search query comprising a new list of keywords that includes each wildcard token not removed from the set of wildcard tokens.

20 Claims, 6 Drawing Sheets

(56) References Cited

U.S. PATENT DOCUMENTS

| | | | | |
|---|---|---|---|---|
| 7,603,705 | B2* | 10/2009 | Roy | G06F 21/554 |
| | | | | 726/22 |
| 8,064,700 | B2* | 11/2011 | King | H04N 1/00244 |
| | | | | 382/181 |
| 9,031,949 | B1* | 5/2015 | Pasca | G06F 16/951 |
| | | | | 707/736 |
| 2002/0179012 | A1* | 12/2002 | Takatsu | C23C 16/45561 |
| | | | | 118/715 |
| 2003/0200199 | A1* | 10/2003 | Snyder | G06F 40/284 |
| 2005/0065967 | A1* | 3/2005 | Schuetze | G06F 16/88 |
| 2007/0168469 | A1 | 7/2007 | Church et al. | |
| 2008/0040345 | A1* | 2/2008 | Cameron | G06F 7/02 |
| 2008/0086488 | A1* | 4/2008 | Nomula | G06F 40/232 |
| 2009/0171936 | A1* | 7/2009 | Kirk | G06F 16/24553 |
| 2009/0287681 | A1 | 11/2009 | Paek et al. | |
| 2011/0035390 | A1* | 2/2011 | Whitehouse | H04L 63/1425 |
| | | | | 707/755 |
| 2011/0087670 | A1* | 4/2011 | Jorstad | G06F 40/284 |
| | | | | 707/741 |
| 2013/0144895 | A1* | 6/2013 | Cameron | G06F 16/83 |
| | | | | 707/755 |
| 2015/0116136 | A1* | 4/2015 | Cameron | G06F 16/83 |
| | | | | 341/55 |
| 2019/0171629 | A1* | 6/2019 | Baum | G06F 16/2477 |
| 2020/0394193 | A1* | 12/2020 | Chen | G06F 16/24553 |

OTHER PUBLICATIONS

A Computer-Assistance Learning System for Emotional Wording (Year: 2015).*

Embarrassed or Awkward? Ranking Emotion Synonyms for ESL Learners' Appropriate Wording, Chen et al., (Year: 2015).*

String Indexing for Patterns with Wildcards, Vildhoj et al., (Year: 2011).*

Document-Specific Keyphrase Extraction Using Sequential Patterns with Wildcards, Xie et al., (Year: 2014).*

Luo, B. et al., "QFilter: Fine-Grained Run-Time XML Access Control via NFA-based Query Rewriting." (Research Paper), Proceedings of the 13th ACM International Conference on Information and Knowledge Management, Nov. 8-13, 2004, 11 pages available at https://s2.ist.psu.edu/paper/OFilter21.pdf.

International Searching Authority, "Notification Of Transmittal Of The International Search Report And The Written Opinion", PCT/US2016/027822, dated Dec. 30, 2016, 14 pages.

* cited by examiner

REMOVING WILDCARD TOKENS FROM A SET OF WILDCARD TOKENS FOR A SEARCH QUERY

BACKGROUND

A search expression may represent a search pattern. A simple search expression may be a list of keyword tokens, and a document containing all these tokens matches the search expression. Search expressions in relational databases may allow users to retrieve a document from a database containing specific keywords.

BRIEF DESCRIPTION OF THE DRAWINGS

The following detailed description references the drawings, wherein.

DETAILED DESCRIPTION

A search expression may include two kinds of tokens: word tokens and wildcard tokens. A wildcard token may include a wildcard character. A wildcard character (often denoted through the use of a wildcard symbol, such as "*"), is a special character representing the substitution of 0 or more characters.

In keyword based text retrieval, the less keywords used, the more efficient the index lookup may be. For example, checking the match of a wildcard token using SQL LIKE or ILIKE, particularly in the case that the wildcard token starts with "*", may be much more computationally expensive than checking the match of a word. Accordingly, examples disclosed herein may "prune" or remove the "physically duplicate" and "logically duplicate" wildcard tokens in a search expression. "Physically duplicate" wildcard tokens may refer to the string-wise equivalent wildcard tokens. For example, "HPE*" is a physically duplicate token of "HPE*", and similarly, "HPE*com" is a physically duplicate token of "HPE*com". A search expression having "logically duplicate" wildcard tokens, e.g., "HP*" being a logically duplicate token of "HPE", may search for any document matching "HPE" that also matches "HP*" (but not necessarily vice versa). As a result, "HP*" can be eliminated from the search expression and may lead to a performance optimization.

Such performance optimization may be accomplished by utilizing an "inferential relationship" between a wildcard token and a word or wildcard token. For example, the match of a word token w may infer the match of a wildcard token t if any string that matches w also matches t. This is represented as match (w, x)-->match (t, x). The match of a wildcard token wt may infer the match of a wildcard token t if any string that matches wt also matches t. This is represented as match (wt, x)-->match (t, x). Any wildcard token which is inferred from a word token or a wildcard token can be eliminated from the list of keywords included in the search expression for enhanced search performance.

An example method may include separating a list of keywords into a set of word tokens and a set of wildcard tokens. The method may also include removing each wildcard token in the set of wildcard tokens that is inferred by at least one word token in the set of word tokens and removing each wildcard token in the set of wildcard tokens that is inferred by at least one other wildcard token in the set of wildcard tokens. The method may also include executing a search query comprising a new list of keywords that includes each wildcard token not removed from the set of wildcard tokens.

Figure 1:
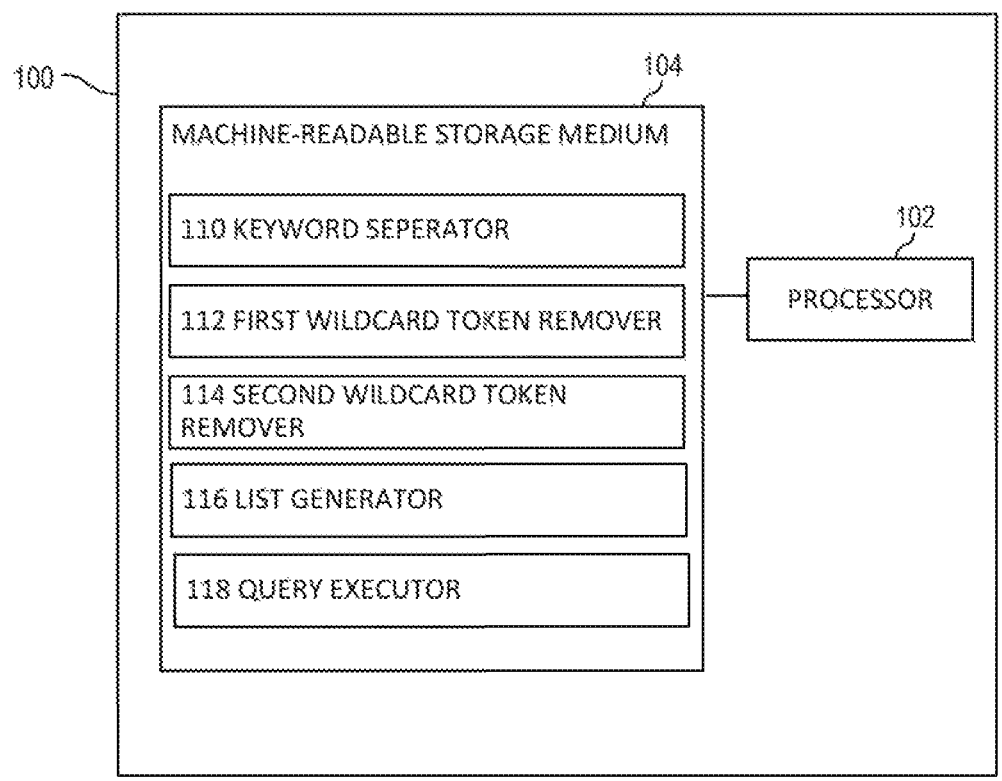
FIG. 1 is a block diagram of an example system for removing keywords from search expressions.

FIG. 1 is a block diagram of an example system 100 for removing keywords from search expressions. System 100 may include a processor 102 and a memory 104 that may be coupled to each other through a communication link (e.g., a bus). Processor 102 may include a Central Processing Unit (CPU) or another suitable hardware processor. In some examples, memory 104 may store machine readable instructions executed by processor 102 for system 100. Memory 104 may include any volatile memory, non-volatile memory, or any suitable combination of volatile and non-volatile memory. Memory 104 may comprise Random Access Memory (RAM), Read-Only Memory (ROM), flash memory, and/or other suitable memory. Memory 104 may also include a random access non-volatile memory that can retain content when the power is off.

Memory 104 stores instructions to be executed by processor 102 including instructions for keyword separator 110, first wildcard token remover 112, second wildcard token remover 114, list generator 116, query executor 118, and/or other components. According to various implementations, system 100 may be implemented in hardware and/or a combination of hardware and programming that configures hardware. Furthermore, in FIG. 1 and other Figures described herein, different numbers of components or entities than depicted may be used.

Processor 102 may execute instructions of keyword separator 110 to separate a list of keywords into a set of word tokens and a set of wildcard tokens. A word token is a set of word characters. For example, a word token may be "HPE", "Computing", etc. A wildcard token contains a wildcard character. A wildcard character (often denoted through the use of a wildcard symbol, such as "*", "%", "_", etc.), is a special character that represents the substitution of 0 or more characters. An example keyword using a wildcard character may be, "HPE*Division", where the wildcard character ("*") represents any combination of characters between the terms "HPE" and "Division." Therefore, "HPE_Computing_Division", "HPE_Networking_Division" or "HPE_Finance_Division" all match "HPE*Division".

The list of keywords may be part of a search expression. A search expression may represent a search pattern. An example search expression, ss, is a list of keyword tokens; a document containing all these tokens matches ss. For example, if the text of a given document is "HP is to be separated into two independent companies: Hewlett Packard Enterprise and HP Inc.", it matches the search expression "HP, independent companies" since all three keywords "HP", "independent" and "companies" are contained in the document.

To speed up text search, inverse indices are often utilized. A word index table may contain two columns: the word token and the ID (e.g. doc_id) of the document containing that word token. In general, the index table contains all of the words, case insensitive or sensitive, appearing in base table's text field.

To search a text field in the base table that contains certain keywords, the first step is to get the doc_ids of the documents containing that keyword, through querying the index table, and then to query the base-table filtered by the resulting doc_ids. An example search query may look something like what is shown in Table 1 below.

TABLE 1

SELECT * FROM base_table WHERE unique_id IN (SELECT
t0.doc_id
FROM index_table t0, index_table t1, index_table t2
WHERE t0.doc_id=t1.doc_id AND t1.doc_id=t2.doc_id
AND t0.token = "transaction" AND t1.token = "response"
AND t2.token = "time");

The example query depicted in Table 1 may be used to extract the documents (identified by the unique_id) which contain the keywords "transaction", "response", and "time". The example query uses a "self-join" operation to join the index_table to identify the matched doc_ids in the index_table, and then use the matched doc_ids as the unique_id of the base_table for querying the base_table.

The index search with wildcard characters normally use matching operations such as LIKE (case sensitive match), ILIKE (case-insensitive match), instead of an equivalence operation ("="). For example, in a SQL statement, the match of a word token, "word", is turned to a condition expression, such as token="word". The match to a wildcard token, say "wild*", is turned to a condition expression, such as token ILIKE "wild %".

An example of index search with two keywords "HPE*Division" and "performance" may look something like what is shown in Table 2 below.

TABLE 2

SELECT * FROM base_table WHERE unique_id IN (SELECT
t0.doc_id
FROM index_table t0, index_table t1
WHERE t0.doc_id=t1.doc_id AND t0.token = "performance"
AND t1.token ILIKE "HPE%Division");

The query depicted in Table 2 is specified in the SQL language where the wildcard character is expressed as "%". In a SQL based search engine, a set of documents, such as logs, may be stored in a base table and all distinct word tokens appearing in these documents may be referred to in the corresponding index table as inversed indices to the base table. The index table may have at least two attributes: token and doc_id, where rows ("HPE", 2), ("HPE", 4), ("HPE", 8) mean that token "HPE" appears in documents with id 2, 4, 8.

Processor 102 may execute instructions of first wildcard token remover 112 to remove each wildcard token in the set of wildcard tokens that is inferred by at least one word token in the set of word tokens. First wildcard token remover 112 may select a wildcard token from the set of wildcard tokens and determine if the selected wildcard token can be inferred by at least one word token in the set of word tokens. Specifically, first wildcard token remover 112 may determine whether the selected wildcard token begins with a wildcard character and/or whether the selected wildcard token ends with a wildcard value. First wildcard token remover 112 may store a value in a memory corresponding to whether the selected wildcard token begins and/or ends with a wildcard character. For example, a first value corresponding to whether the selected wildcard token begins with the wildcard character can be set to true if the wildcard token begins with the wildcard character, and can be set to false if the wildcard token does not begin with the wildcard character. Similarly, a second value corresponding to whether the selected wildcard token ends with the wildcard character can be set to true if the wildcard token ends with the wildcard character, and can be set to false if the wildcard token does not end with the wildcard character.

First wildcard token remover 112 may also split the wildcard token by the wildcard character. In other words, wildcard token remover may remove each wildcard character from the wildcard token and create an array including each element of the wildcard token that preceded and/or followed the wildcard character. For example, the wildcard token "e*HP" may be split by the wildcard character ("*"), in order to remove the wildcard characters ("*") and creates an array containing the elements "e" and "HP". First wildcard token remover 112 may then select at least one word token from the set of word tokens to compare to the selected wildcard. In some aspects, first wildcard token remover 112 may compare the selected wildcard token to each word token in the set of word tokens.

Specifically, first wildcard token remover 112 may determine whether a wildcard token can be inferred from a word token by using at least one of the four arguments discussed above: (1) the array created from the wildcard token, (2) the word token chosen for comparison, (3) the first value corresponding to whether the wildcard token begins with the wildcard character, and (4) the second value corresponding to whether the wildcard token ends with the wildcard character. In some implementations, first wildcard token remover 112 may determine if three conditions are met: (1) that all elements in the array are contained in the word token chosen for comparison, (2) that the first element of the array matches the beginning element of the word token if the wildcard token does not begin with the wildcard character, and (3) that the last element of the array matches the end element of the word token if the wildcard token does not end with the wildcard character. If all three conditions are satisfied, then first wildcard token remover 112 may determine that the wildcard token is inferable from the word token. Further details on determining whether the three conditions are satisfied are provided below.

In regards to determining if the first condition is satisfied, first wildcard token remover 112 may determine whether all of elements in the array (created from the selected wildcard token) are also contained in the word token chosen for comparison. First wildcard token remover 112 may also determine whether the wildcard token begins with the wildcard character.

In regards to determining if the second condition is satisfied, first wildcard token remover 112 may determine whether the wildcard token begins with the wildcard character. First wildcard token remover 112 may determine this by determining whether the first value is set to true. If the first value is set to false and/or the wildcard token does not begin with the wildcard character, first wildcard token remover 112 may determine whether the first element of the array matches the first character of the word token chosen for comparison. If the wildcard token does not begin with the wildcard character and the first element of the array matches the first character of the word token, than the second condition is satisfied. If the first value is set to true and/or the wildcard token does begin with the wildcard character, the first element of the array does not need to match the first character of the word token chosen for comparison. In this case, the second condition is not applicable and may be considered satisfied.

In regards to determining if the third condition is satisfied, first wildcard token remover 112 may determine whether the wildcard token ends with the wildcard character. First wildcard token remover 112 may determine this by determining whether the second value is set to true. If the second value is set to false and/or the wildcard token does not begin with the wildcard character, first wildcard token remover 112 may determine whether the last element of the array matches the ending element of the word token chosen for comparison. If the second value is set to true and/or the wildcard token does begin with the wildcard character, the first element of the array does not need to match the last character of the word token chosen for comparison. In this case, the third condition is not applicable and may be considered satisfied.

An example search query with a word token and a wildcard token may look something like what is shown in Table 3 below.

TABLE 3

--> NewHPE *e*HPE
SELECT * FROM base_table WHERE unique_id IN (SELECT doc_id FROM index_table WHERE token = "NewHPE");

The example search query of Table 3 includes a word token "NewHPE" and a wildcard token "*e*HPE". First wildcard token remover 112 may analyze the search query to determine if the wildcard token can be inferred by the word token. Specifically, first wildcard token remover 112 may determine that the wildcard token begins with the wildcard character and does not end with the wildcard character. Accordingly, first wildcard token remover 112 may flag a first value as true and a second value as false. First wildcard token remover 112 may determine that each element of the wildcard token ("e", "HPE") is included in the word token and thus that the first condition is satisfied. First wildcard token remover 112 may determine that the first value is true and thus the first element of the wildcard token does not need to match the first element of the word token. Thus, the second condition is satisfied. First wildcard token remover 112 may determine because the second value is false and the last element of the wildcard token ("HPE") matches the last element of the word token, that the third condition is satisfied. Accordingly, all conditions are met and the wildcard token is inferable from the word token. Accordingly, the wildcard token may be removed from the set of tokens.

Another example search query with a word token and a wildcard token may look something like what is shown in Table 4 below.

TABLE 4

--> NewHPE Ne*HP
SELECT * FROM base_table WHERE unique_id IN (SELECT doc_id FROM index_table WHERE token = "NewHPE") AND unique_id IN (SELECT doc_id FROM index_table WHERE token ILIKE "Ne%HP");

The example search query of Table 4 includes a word token "NewHPE" and a wildcard token "Ne*HP". First wildcard token remover 112 may analyze the search query to determine that if the wildcard token can be inferred by the word token. Specifically, first wildcard token remover 112 may determine that the wildcard token does not begin with the wildcard character and does not end with the wildcard character. Accordingly, first wildcard token remover 112 may flag a first value as false and a second value as false. First wildcard token remover 112 may determine that each element of the wildcard token ("Ne", "HP") is included in the word token and thus that the first condition is satisfied. First wildcard token remover 112 may determine that the first value is false and that the first element ("Ne") of the wildcard token matches the first element of the word token. Thus, the second condition is satisfied. First wildcard token remover 112 may determine because the second value is false and the last element of the wildcard token ("HP") does not match the last element of the word token, that the third condition is failed. Accordingly, all conditions are not satisfied and the wildcard token is not inferable from the word token. Accordingly, the wildcard token may not be removed from the set of tokens.

Processor 102 may execute instructions of second wildcard token remover 114 to remove each wildcard token in the set of wildcard tokens that is inferred by at least one other wildcard token in the set of wildcard tokens.

Second wildcard token remover 114 may select a wildcard token from the set of wildcard tokens and determine if the selected wildcard token can be inferred by at least one other wildcard token in the set of wildcard tokens. Specifically, second wildcard token remover 114 may determine whether the selected wildcard token begins with a wildcard character and/or whether the selected wildcard token ends with a wildcard character. Second wildcard token remover 114 may store a value in a memory corresponding to whether the selected wildcard token begins and/or ends with a wildcard character. For example, a first value corresponding to whether the selected wildcard token begins with the wildcard character can be set to true if the wildcard token begins with the wildcard character and can be set to false if the wildcard token does not begin with the wildcard character. Similarly, a second value corresponding to whether the selected wildcard token ends with the wildcard character can be set to true if the wildcard token ends with the wildcard character and can be set to false if the wildcard token does not end with the wildcard character.

Second wildcard token remover 114 may also split the comparison wildcard token by the wildcard character. In other words, wildcard token remover may remove each wildcard character from the comparison wildcard token and create a second array including each element of the comparison wildcard token that preceded and/or followed the wildcard character.

Second wildcard token remover 114 may determine whether the comparison wildcard token begins with a wildcard character and/or whether the comparison wildcard token ends with a wildcard character. Second wildcard token remover 114 may store a third value in a memory corresponding to whether the comparison wildcard token begins with a wildcard character and a fourth value a memory corresponding to whether the comparison wildcard token ends with a wildcard character.

Specifically, second wildcard token remover 114 may determine whether a wildcard token can be inferred from a word token by using at least one of the six arguments discussed above: (1) the array created from the selected wildcard token, (2) the second array created from the comparison wildcard token, (3) the first value corresponding to whether the selected wildcard token begins with the wildcard character, (4) the second value corresponding to whether the selected wildcard token ends with the wildcard character, (5) the third value corresponding to whether the comparison wildcard token begins with the wildcard character, and (6) the fourth value corresponding to whether the comparison wildcard token ends with the wildcard character.

In some implementations, second wildcard token remover 114 may use the six values to determine if five conditions are met: (1) that all elements in the first array are contained in the second array, (2) that the selected wildcard token begins with the wildcard character if the comparison wildcard token begins with the wildcard character, (3) that the selected wildcard token ends with the wildcard character if the comparison wildcard token ends with the wildcard character, (4) that the first element of the array matches the beginning element of the second array if the selected wildcard token does not begin with the wildcard character, and (5) that the last element of the array matches the end element of the second array if the selected wildcard token does not end with the wildcard character. If all five conditions are satisfied, then second wildcard token remover 114 may determine that the selected wildcard token is inferable from the comparison wildcard token. Further details on determining whether the five conditions are satisfied are provided below.

In regards to determining if the first condition is satisfied, second wildcard token remover 114 may determine whether all of elements in the first array (created from the selected wildcard token) are also contained in the word token second array (created from the comparison wildcard token).

In regards to determining if the second condition is satisfied, second wildcard token remover 114 may determine whether the comparison wildcard token begins with the wildcard character. Second wildcard token remover 114 may determine this by determining whether the first value is set to true. If the first value is set to true and/or the comparison wildcard token does begin with the wildcard character, second wildcard token remover 114 may determine whether the selected wildcard token also begins with the wildcard character. Second wildcard token remover 114 may determine this by determining whether the third value is set to true. If both the comparison wildcard token and the selected wildcard token begin with the wildcard character, than the second condition is satisfied. If the first value is set to false and/or the wildcard token does not begin with the wildcard character, then the second condition is not applicable and may be considered satisfied.

In regards to determining if the third condition is satisfied, second wildcard token remover 114 may determine whether the comparison wildcard token ends with the wildcard character. Second wildcard token remover 114 may determine this by determining whether the second value is set to true. If the second value is set to true and/or the comparison wildcard token does end with the wildcard character, second wildcard token remover 114 may determine whether the selected wildcard token also ends with the wildcard character. Second wildcard token remover 114 may determine this by determining whether the fourth value is set to true. If both the comparison wildcard token and the selected wildcard token end with the wildcard character, than the second condition is satisfied. If the first value is set to false and/or the wildcard token does not end with the wildcard character, then the third condition is not applicable and may be considered satisfied.

In regards to determining if the second condition is satisfied, second wildcard token remover 114 may determine whether the wildcard token begins with the wildcard character. Second wildcard token remover 114 may determine this by determining whether the first value is set to true. If the first value is set to false and/or the wildcard token does not begin with the wildcard character, second wildcard token remover 114 may determine whether the first element of the array matches the first character of the word token chosen for comparison. If the wildcard token does not begin with the wildcard character and the first element of the array matches the first character of the word token, than the second condition is satisfied. If the first value is set to true and/or the wildcard token does begin with the wildcard character, the first element of the array does not need to match the first character of the word token chosen for comparison. In this case, the second condition is not applicable and may be considered satisfied.

In regards to determining if the third condition is satisfied, second wildcard token remover 114 may determine whether the wildcard token ends with the wildcard character. Second wildcard token remover 114 may determine this by determining whether the second value is set to true. If the second value is set to false and/or the wildcard token does not begin with the wildcard character, second wildcard token remover 114 may determine whether the last element of the array matches the ending element of the word token chosen for comparison. If the second value is set to true and/or the wildcard token does begin with the wildcard character, the first element of the array does not need to match the last character of the word token chosen for comparison. In this case, the third condition is not applicable and may be considered satisfied.

An example search query with two wildcard tokens may look something like what is shown in Table 5 below.

TABLE 5

--> *Interest*rate*hike* *int*hike
SELECT * FROM base_table WHERE unique_id IN (SELECT doc_id FROM index_table WHERE token ILIKE "%interest%rate%hike%")
AND unique_id IN (SELECT doc_id FROM index_table WHERE token ILIKE "%int%hike");

The example search query of Table 5 includes a first wildcard token "interest*rate*hike*" and a second wildcard token "int*hike". For the sake of explanation, "interest*rate*hike*" may be the comparison word token and "int*hike" may be the selected word token. Second wildcard token remover 114 may analyze the search query to determine if the selected wildcard token can be inferred by the comparison word token. Specifically, second wildcard token remover 114 may determine that the selected wildcard token begins with the wildcard character and does not end with the wildcard character. Accordingly, second wildcard token remover 114 may flag a first value as true and a second value as false. Second wildcard token remover 114 may determine that the comparison wildcard token begins with the wildcard character and ends with the wildcard character. Accordingly, second wildcard token remover 114 may flag a third value as true and a fourth value as true.

Second wildcard token remover 114 may create a first array including each element of the selected wildcard token split by the wildcard character. The first array may include the elements "int" and "hike." Similarly, second wildcard token remover 114 may create a second array including each element of the comparison wildcard token split by the wildcard character. The second array may include the elements "interest", "rate", and "hike." Second wildcard token remover 114 may determine that each element of the first array ("int", "hike") is included in second array ("interest", "rate", and "hike") and thus that the first condition is satisfied.

Second wildcard token remover 114 may determine that because the third value is true and the comparison wildcard token begins with the wildcard character, the selected wildcard token should also begin with the wildcard character. Because the first value is true and the selected wildcard character does begin with the wildcard character, the second condition is satisfied. Second wildcard token remover 114 may determine that because the fourth value is false and the comparison wildcard does not end with a wildcard, the third condition is not applicable and is considered satisfied.

Second wildcard token remover 114 may determine that because the first value is true and the selected wildcard token begins with the wildcard character, the fourth condition is not applicable and is considered satisfied. Second wildcard token remover 114 may determine that because the second value is false and the selected wildcard token ends with the wildcard character, the last element of the first array should match the last element of the second array. Because the last element of the first array ("hike") matches the last element of the second array ("hike"), the fifth condition is satisfied. Accordingly, all conditions are met and the selected wildcard token is inferable from the comparison wildcard token. Accordingly, the selected wildcard token may be removed from the set of tokens. Although Tables 1-5 show examples using SQL, the techniques disclosed herein may be used in any type of search query.

Processor 102 may execute instructions of list generator 116 to generate a new list of keywords including each wildcard token not removed from the set of wildcard tokens.

Processor 102 may execute instructions of query executor 118 to execute a search query comprising a new list of keywords that includes each wildcard token not removed from the set of wildcard tokens. The new list of keywords may be generated before execution of the search query. The search query may be, for example, an SQL query.

Figure 2:
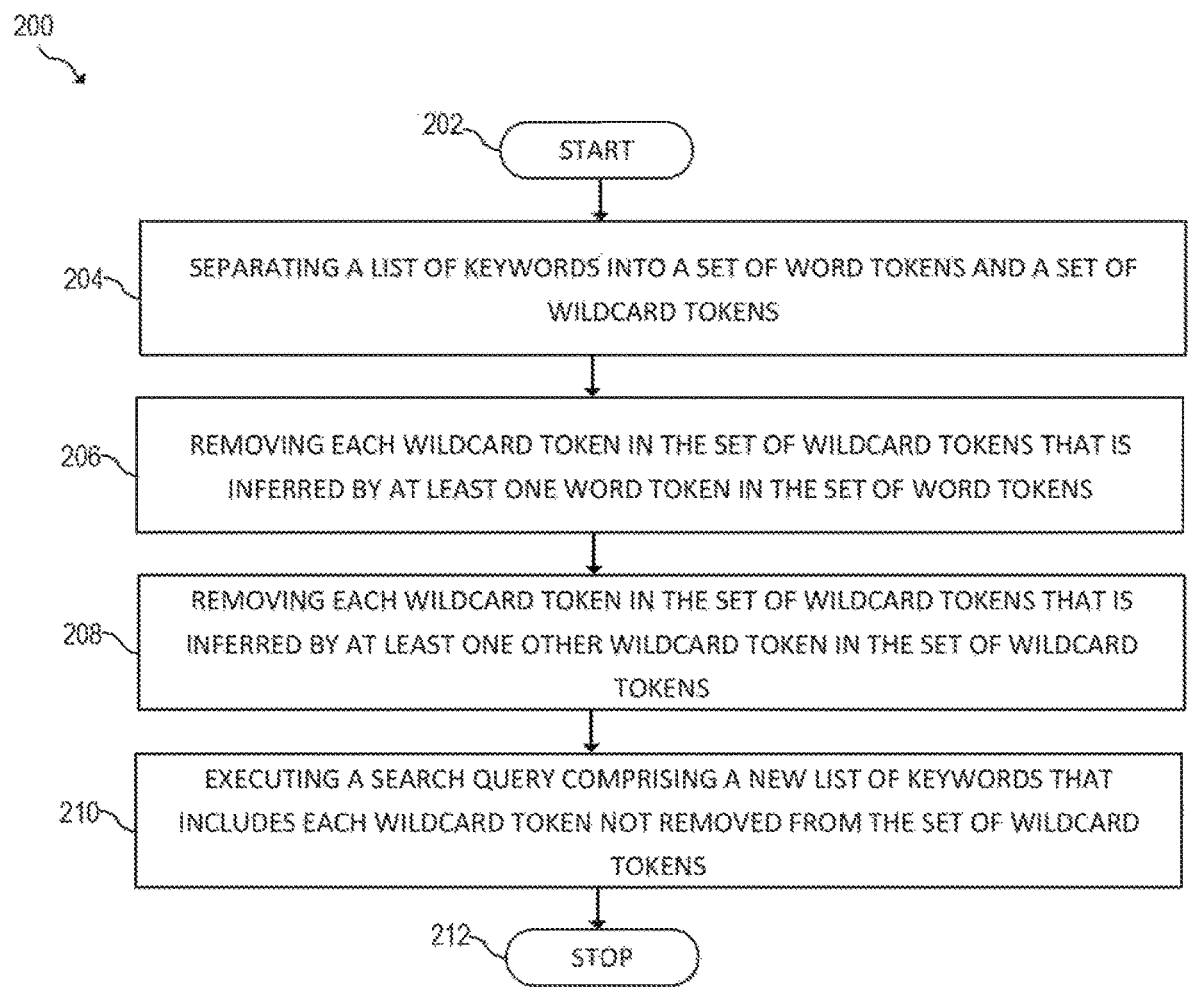
FIG. 2 is a flowchart of an example method for removing keywords from search expressions.

FIG. 2 is a flowchart of an example method 200 for removing keywords from search expressions. Method 200 may be described below as being executed or performed by a system, for example, system 100 of FIG. 1, system 500 of FIG. 5, and/or system 600 of FIG. 6. Other suitable systems and/or computing devices may be used as well.

Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Method 200 may start at block 202 and continue to block 204, where the method may include separating a list of keywords into a set of word tokens and a set of wildcard tokens. At block 206, the method may include removing each wildcard token in the set of wildcard tokens that is inferred by at least one word token in the set of word tokens. A wildcard token may be inferred by a word token if any string that matches the wildcard token also matches the word token. At block 208, the method may include removing each wildcard token in the set of wildcard tokens that is inferred by at least one other wildcard token in the set of wildcard tokens. A wildcard token may be inferred by the other wildcard token if any string that matches the wildcard token also matches the other wildcard token. At block 210, the method may include executing a search query comprising a new list of keywords that includes each wildcard token not removed from the set of wildcard tokens. The new list of keywords may be generated before execution of the search query. The search query may be, for example, an SQL query. Method 200 may eventually continue to block 212, where method 200 may stop.

Figure 3:
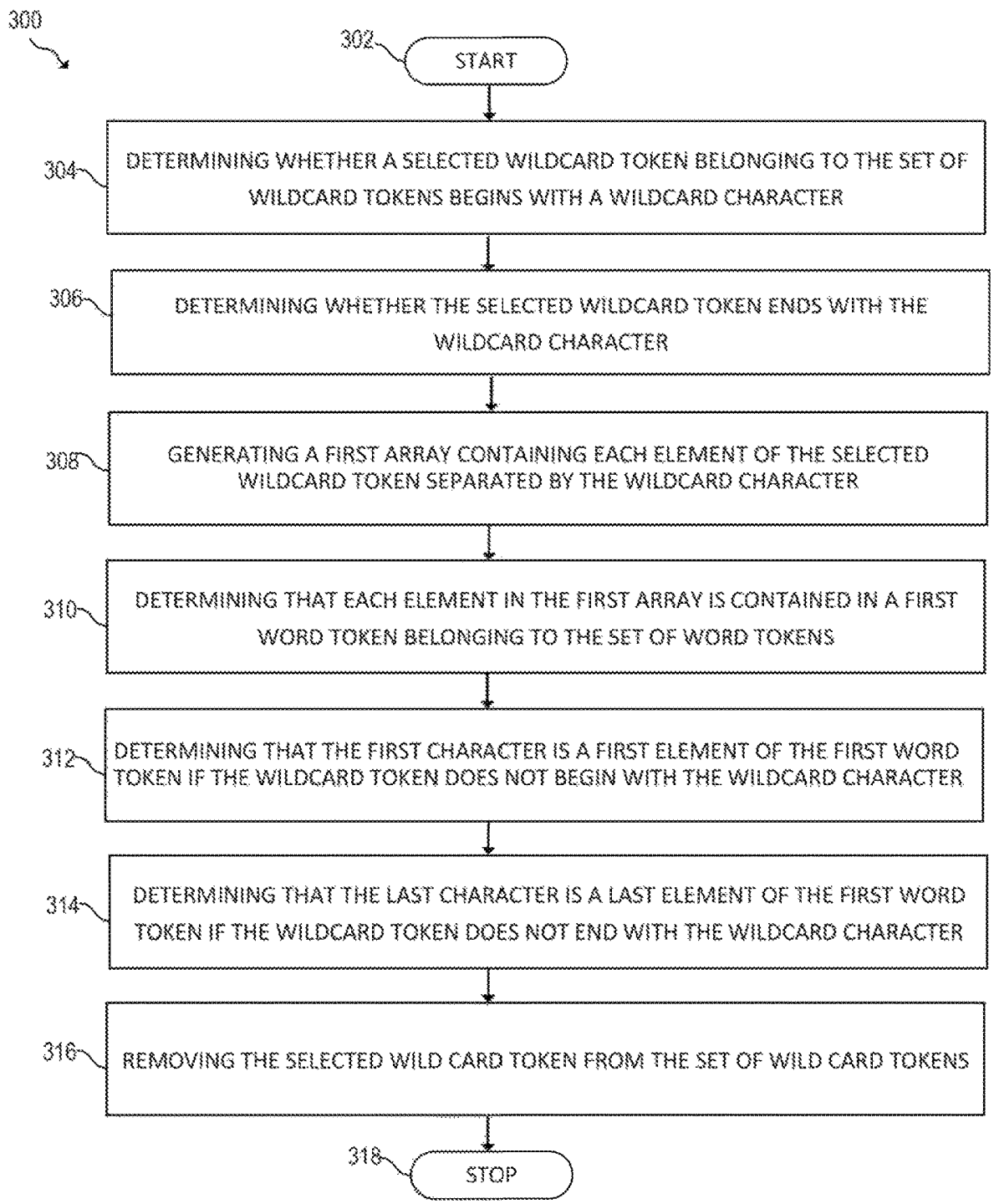
FIG. 3 is a flowchart of another example method for removing keywords from search expressions.

FIG. 3 is a flowchart of an example method 300 for removing a wildcard token from the set of wildcard tokens. Method 300 may be described below as being executed or performed by a system, for example, system 100 of FIG. 1, system 500 of FIG. 5, and/or system 600 of FIG. 6. Other suitable systems and/or computing devices may be used as well.

Method 300 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 300 may be implemented in the form of electronic circuitry (e.g., hardware). At least one block of method 300 may be executed substantially concurrently or in a different order than shown in FIG. 3. Method 300 may include more or less blocks than are shown in FIG. 3. Some of the blocks of method 300 may, at certain times, be ongoing and/or may repeat.

Method 300 may start at block 302 and continue to block 304, where the method may include determining, whether a selected wildcard token belonging to a set of wildcard tokens begins with a wildcard character. Although method 300 describes selected a single wildcard token for the sake of simplicity, the method 300 may be performed for any number of wildcard tokens belonging to the set of wildcard tokens. A value representing whether the selected wildcard token begins with a wildcard character may be stored on a memory for future use. At block 306, the method may include determining whether the selected wildcard token ends with the wildcard character. A value representing whether the selected wildcard token ends with the wildcard character may be stored on a memory for future use.

At block 308, the method may include generating a first array containing each element of the selected wildcard token separated by the wildcard character. The first array may include a first character of the selected wildcard token and a last character of the wildcard token. For example, given a wildcard token "e*HPE", the wildcard token may be split by the wildcard character ("*"), producing elements "e" and "HPE" of the first array.

At block 310, the method may include determining that each element in the first array is contained in a first word token belonging to the set of word tokens. At block 312, the method may include determining that the first character is a first element of the first word token if the wildcard token does not begin with the wildcard character. At block 314, the method may include determining that the last character is a last element of the first word token if the wildcard token does not end with the wildcard character. At block 316, the method may include removing the selected wildcard token from the set of wildcard tokens. Method 300 may eventually continue to block 318, where method 300 may stop.

Figure 4:
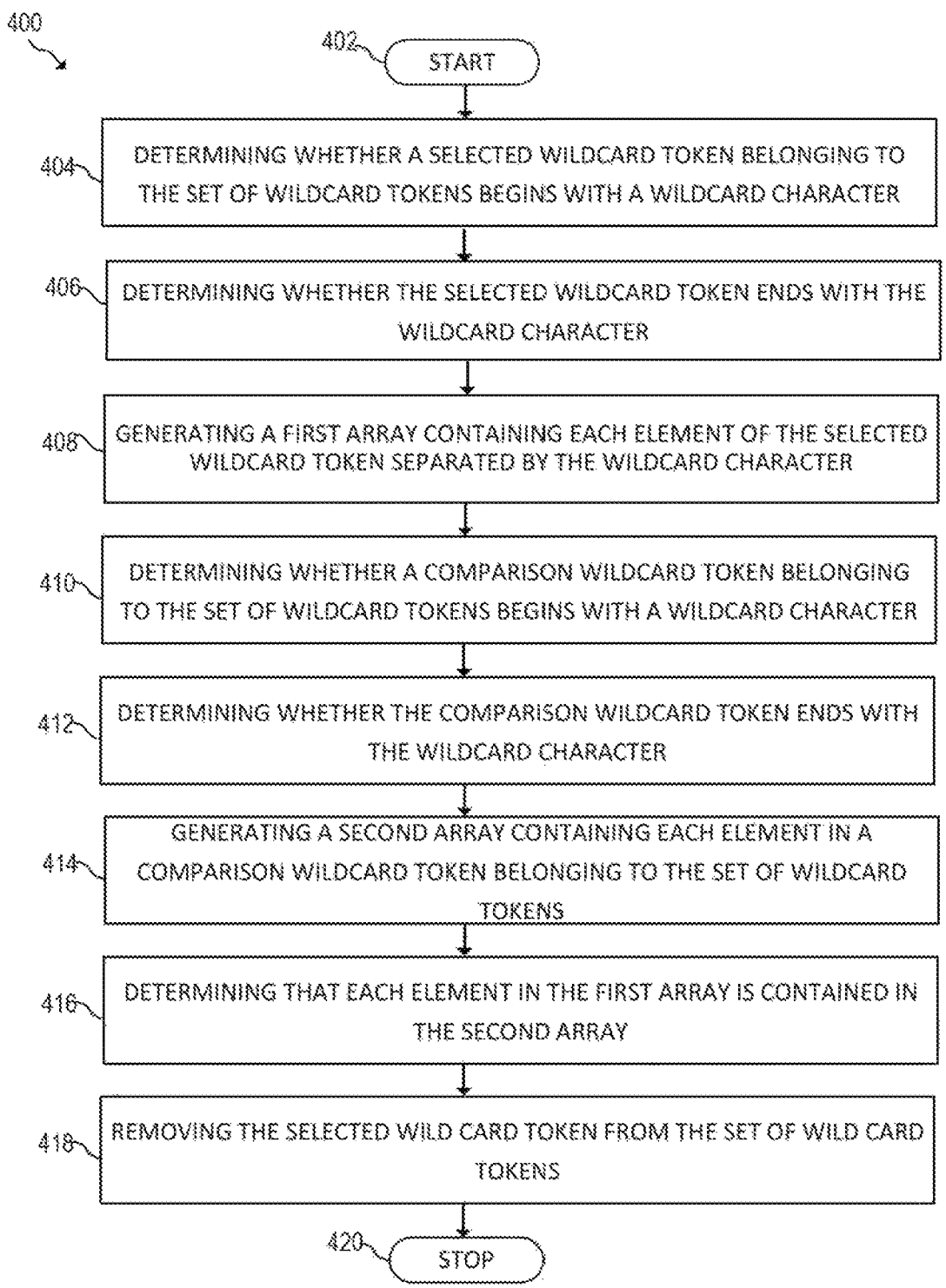
FIG. 4 is a flowchart of another example method for removing keywords from search expressions.

FIG. 4 is a flowchart of an example method 400 for removing a wildcard token from a set of wildcard tokens. Method 400 may be described below as being executed or performed by a system, for example, system 100 of FIG. 1, system 500 of FIG. 5, and/or system 600 of FIG. 6. Other suitable systems and/or computing devices may be used as well.

Method 400 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 400 may be implemented in the form of electronic circuitry (e.g., hardware). At least one block of method 400 may be executed substantially concurrently or in a different order than shown in FIG. 4. Method 400 may include more or less blocks than are shown in FIG. 4. Some of the blocks of method 400 may, at certain times, be ongoing and/or may repeat.

Method 400 may start at block 402 and continue to block 404, where the method may include determining, whether a selected wildcard token belonging to the set of wildcard tokens begins with a wildcard character. At block 406, the method may include determining whether the selected wildcard token ends with the wildcard character. At block 408, the method may include generating a first array containing each element of the selected wildcard token separated by the wildcard character. The first array may include at least a first character and a last character. At block 410, the method may include determining, whether a comparison wildcard token belonging to the set of wildcard tokens begins with a wildcard character. If it is determined that the selected wildcard token does begin with the wildcard character (as referred to above in reference to block 404), the method may include determining that the comparison wildcard token begins with the wildcard character. At block 412, the method may include determining whether the comparison wildcard token ends with the wildcard character. In some aspects. if it is determined that the selected wildcard token does begin with the wildcard character (as referred to above in reference to block 406), the method may include determining that the comparison wildcard token ends with the wildcard character.

At block 414, the method may include generating a second array containing each element in a comparison wildcard token separated by the wildcard character. The comparison wildcard token may belong to the set of wildcard tokens. The second array may include at least a beginning element and an end element. At block 416, the method may include determining that each element in the first array is contained in the second array. The method may include determining that the first element is the same as the beginning element if the selected wildcard token does not begin with the wildcard character and determining that the last element is the same as the end element if the selected wildcard token does not end with the wildcard character. The method may also include determining that the comparison wildcard token begins with the wildcard character if the selected wildcard token begins with the wildcard character and determining that the comparison wildcard token ends with the wildcard character if the selected wildcard token end with the wildcard character. At block 418, the method may include removing the selected wildcard token from the set of wildcard tokens. Method 400 may eventually continue to block 420, where method 400 may stop.

Figure 5:
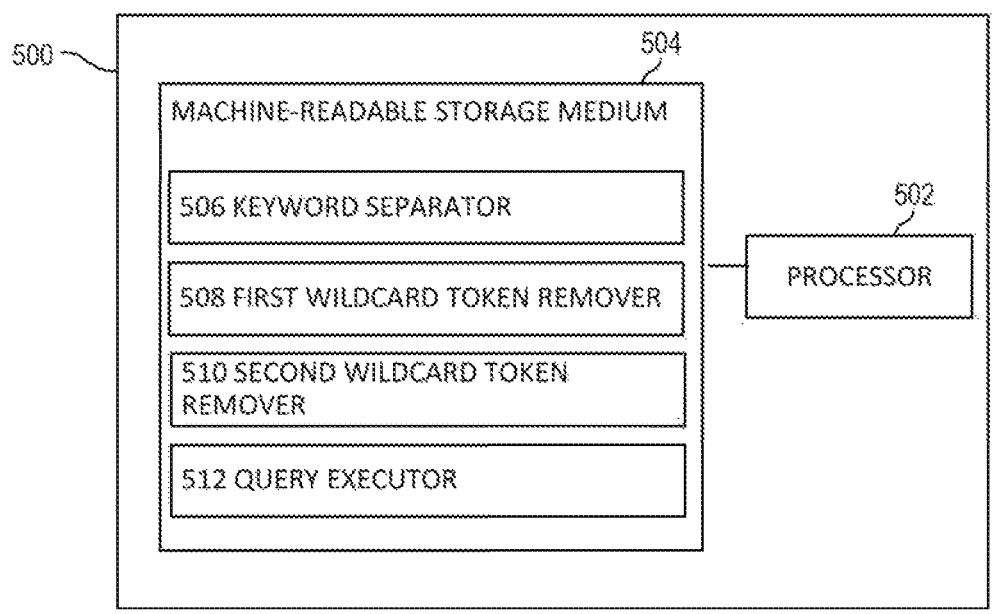
FIG. 5 is a block diagram of an example system for removing keywords from search expressions.

FIG. 5 is a block diagram of an example system 500 for removing keywords from search expressions. System 500 may include a processor 502 and a memory 504 that may be coupled to each other through a communication link (e.g., a bus). Processor 502 may include a Central Processing Unit (CPU) or another suitable hardware processor. In some examples, memory 504 stores machine readable instructions executed by processor 502 for system 500. Memory 504 may include any volatile memory, non-volatile memory, or any suitable combination of volatile and non-volatile memory. Memory 504 may comprise Random Access Memory (RAM), Read-Only Memory (ROM), flash memory, and/or other suitable memory. Memory 504 may also include a random access non-volatile memory that can retain content when the power is off.

Memory 504 stores instructions to be executed by processor 502 including instructions for a keyword separator 506, first wildcard token remover 508, second wildcard token remover 510 and a query executor 512. The components of system 500 may be implemented in the form of executable instructions stored on at least one machine-readable storage medium of system 500 and executed by at least one processor of system 500. The machine-readable storage medium may be non-transitory. Each of the components of system 500 may be implemented in the form of at least one hardware device including electronic circuitry for implementing the functionality of the component.

Processor 502 may execute instructions of keyword separator 506 to separate a list of keywords into a set of word tokens and a set of wildcard tokens. Processor 502 may execute instructions of first wildcard token remover 508 to remove each wildcard token in the set of wildcard tokens that is inferred by at least one word token in the set of word tokens. A first wildcard token may be inferred by a first word token if any string that matches the first wildcard token also matches the first wildcard token. Processor 502 may execute instructions of a second wildcard token 510 remover to remove each wildcard token in the set of wildcard tokens that is inferred by at least one wildcard token in the set of wildcard tokens. A second wildcard token may be inferred by a third wildcard token if any string that matches the second wildcard token also matches the third wildcard token. Processor 502 may execute instructions of query executor 512 to execute a search query comprising a new list of keywords that includes each wildcard token not removed from the set of wildcard tokens. The new list of keywords may be generated before execution of the search query. The search query may be, for example, an SQL query.

Figure 6:
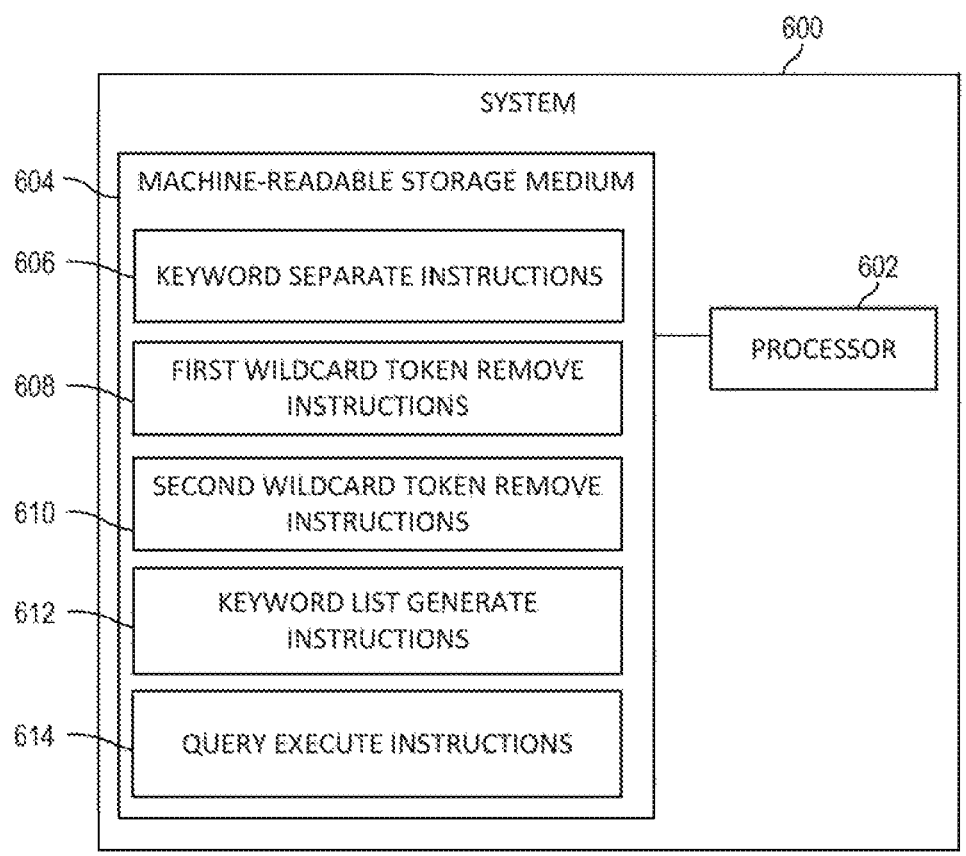
FIG. 6 is a block diagram of an example system for removing keywords from search expressions.

FIG. 6 is a block diagram of an example system 600 for removing keywords from search expressions. System 600 may be similar to system 100 of FIG. 1, for example. In the example illustrated in FIG. 6, system 600 includes a processor 602 and a machine-readable storage medium 604. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 602 may be at least one central processing unit (CPU), microprocessor, and/or other hardware devices suitable for retrieval and execution of instructions stored in machine-readable storage medium 604. In the example illustrated in FIG. 6, processor 602 may fetch, decode, and execute instructions 606, 608,610, 612 and 614 to remove keywords from search expressions. Processor 602 may include at least one electronic circuit comprising a number of electronic components for performing the functionality of at least one of the instructions in machine-readable storage medium 604. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 604 may be any electronic, magnetic, optical, or other physical storage device that stores executable instructions. Thus, machine-readable storage medium 604 may be, for example, Random Access Memory (RAM), an Electrically-Erasable Programmable Read-Only Memory (EEPROM), a storage drive, an optical disc, and the like. Machine-readable storage medium 604 may be disposed within system 600, as shown in FIG. 6. In this situation, the executable instructions may be "installed" on the system 600. Machine-readable storage medium 604 may be a portable, external or remote storage medium, for example, that allows system 600 to download the instructions from the portable/external/remote storage medium. In this situation, the executable instructions may be part of an "installation package". As described herein, machine-readable storage medium 604 may be encoded with executable instructions for context aware data backup. The machine-readable storage medium may be non-transitory.

Referring to FIG. 6, keyword separate instructions 606, when executed by a processor (e.g., 602), may cause system 600 to separate a list of keywords into a set of word tokens and a set of wildcard tokens. First wildcard token remove instructions 608, when executed by a processor (e.g., 602), may cause system 600 to remove each wildcard token in the set of wildcard tokens that is inferred by at least one word token in the set of word tokens. A wildcard token is inferred by a word token if any string that matches the wildcard token also matches the word token. Second wildcard token remove instructions 610, when executed by a processor (e.g., 602), may cause system 600 to remove each wildcard token in the set of wildcard tokens that is inferred by at least one wildcard token in the set of wildcard tokens. A wildcard token may be inferred by the other wildcard token if any string that matches the wildcard token also matches the other wildcard token. Keyword list generate instructions 612, when executed by a processor (e.g., 602), may cause system 600 to generate a new list of keywords including each wildcard token not removed from the set of wildcard tokens. Query execute instructions 614, when executed by a processor (e.g., 602), may cause system 600 to execute a search query using the new list of keywords. The new list of keywords may be generated before execution of the search query. The search query may be, for example, an SQL query.

The foregoing disclosure describes a number of examples for removing keywords from search expressions. The disclosed examples may include systems, devices, computer-readable storage media, and methods for removing keywords from search expressions. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method for electronically removing keywords from a list of keywords in a search expression for retrieving documents stored electronically from a database, comprising:
    entering the search expression for retrieving the document stored electronically from the database;
    separating, by a processor, the list of keywords into a set of word tokens and a set of wildcard tokens,
    wherein each wildcard token contains a wildcard character and one or more word characters and each word token contains one or more word characters and no wildcard character;
    removing, by the processor, each wildcard token in the set of wildcard tokens that is inferred by at least one word token in the set of word tokens,
    removing, by the processor, each wildcard token in the set of wildcard tokens that is inferred by at least one other wildcard token in the set of wildcard tokens;
    wherein removing each wildcard token in the set of wildcard tokens that is inferred by at least one word token in the set of word tokens and removing each wildcard token in the set of wildcard tokens that is inferred by at least one other wildcard token in the set of wildcard tokens removes keywords from the list of keywords; and
    executing, by the processor, a search query comprising a new list of keywords from the list of keywords separated into the set of word tokens and the set of wildcard tokens that includes each of the word tokens of the set of word tokens and each wildcard token not removed from the set of wildcard tokens.

2. The method of claim wherein each wildcard token is inferred by a word token if any string that matches the wildcard token also matches the word token.

3. The method of claim 1, wherein each wildcard token is inferred by the at least one other wildcard token if any string that matches the wildcard token also matches the at least one other wildcard token.

4. The method of claim 1, wherein the list of keywords is included in an SQL query and the new list of keywords is generated before execution of the SQL query.

5. The method of claim 1, further comprising:
    determining, whether a selected wildcard token belonging to the set of wildcard tokens begins with the wildcard character;
    determining whether the selected wildcard token ends with the wildcard character; and
    generating a first array containing each element of the selected wildcard token separated by the wildcard character,
    wherein the first array includes a first character and a last character.

6. The method of claim 5, further comprising:
    determining that each element in the first array is contained in a first word token belonging to the set of word tokens;
    determining that the first character of the first array is a first element of the first word token if the selected wildcard token does not begin with the wildcard character;
    determining that the last character of the first array is a last element of the first word token if the selected wildcard token does not end with the wildcard character; and
    removing the selected wildcard token from the set of wildcard tokens.

7. The method of claim 1, further comprising:
determining, whether a selected wildcard token belonging to the set of wildcard tokens begins with the wildcard character;
determining whether the selected wildcard token ends with the wildcard character;
generating a first array containing each element of the selected wildcard token separated by the wildcard character,
wherein the first array includes a first character and a last character;
generating a second array containing each element in a comparison wildcard token separated by the wildcard character,
wherein the comparison wildcard token belonging to the set of wildcard tokens and the second array includes a beginning element and an end element;
determining that each element in the first array is contained in the second array;
determining that the first character of the first array is a same as the beginning element of the second array if the selected wildcard token does not begin with the wildcard character;
determining that the last character of the first array is a same as the end element of the second array if the selected wildcard token does not end with the wildcard character; and
removing the selected wildcard token from the set of wildcard tokens.

8. The method of claim 7, further comprising:
determining that the comparison wildcard token begins with the wildcard character if the selected wildcard token begins with the wildcard character; and
determining that the comparison wildcard token ends with the wildcard character if the selected wildcard token ends with the wildcard character.

9. The method of claim 1, wherein each wildcard token is inferred by a word token if each element of a string representing the wildcard token is contained in the word token, a first element of the string matches a first element of the word token if the wildcard token does not begin with the wildcard character and a last element of the string matches a last element of the word token if the wildcard token does not end with the wildcard character.

10. The method of claim 1, wherein each wildcard token is inferred by the at least one other wildcard token if each element of a string representing the wildcard token is contained in a string representing the at least one other wildcard token, the wildcard token and the at least one other wildcard token begin with the wildcard character, the wildcard token and the at least one other wildcard token end with the wildcard character, a first element of the string of the wildcard token matches a first element of the string of the at least one other wildcard token if the wildcard token does not begin with the wildcard character and a last element of the string of the wildcard token matches a last element of the string of the at least one other wildcard token if the wildcard token does not end with the wildcard character.

11. A system for electronically removing keywords from a list of keywords in a search expression for retrieving documents stored electronically from a database, comprising:
a keyword separator to separate the list of keywords into a set of word tokens and a set of wildcard tokens,
wherein each wildcard token contains a wildcard character and one or more word characters and each word token contains one or more word characters and no wildcard character;
a first wildcard token remover to remove each wildcard token in the set of wildcard tokens that is inferred by at least one word token in the set of word tokens;
wherein a first wildcard token is inferred by a first word token if any string that matches the first wildcard token also matches the first word token;
a second wildcard token remover to remove each wildcard token in the set of wildcard tokens that is inferred by at least one other wildcard token in the set of wildcard tokens,
wherein a second wildcard token is inferred by a third wildcard token if any string that matches the second wildcard token also matches the third wildcard token,
wherein removing each wildcard token in the set of wildcard tokens that is inferred by at least one word token in the set of word tokens and removing each wildcard token in the set of wildcard tokens that is inferred by at least one other wildcard token in the set of wildcard tokens removes keywords from the list of keywords; and
a query executor to execute a search query comprising a new list of keywords from the list of keywords separated into the set of word tokens and the set of wildcard tokens that includes each of the word tokens of the set of word tokens and each wildcard token not removed from the set of wildcard tokens.

12. The system of claim 11, wherein the first wildcard token remover is further configured to:
determine whether a selected wildcard token belonging to the set of wildcard tokens begins with the wildcard character;
determine whether the selected wildcard token ends with the wildcard character;
generate an array containing each element of the selected wildcard token separated by the wildcard character,
wherein the array includes a first character and a last character;
determine that each element in the array is contained in a selected word token belonging to the set of word tokens;
determine that the first character of the array is a first element of the selected word token if the selected wildcard token does not begin with the wildcard character;
determine that the last character of the array is a last element of the selected word token if the selected wildcard token does not end with the wildcard character; and
remove the selected wildcard token from the set of wildcard tokens.

13. The system of claim 11, wherein the second wildcard token remover is further configured to:
determine whether a selected wildcard token belonging to the set of wildcard tokens begins with the wildcard character;
determine whether the selected wildcard token ends with the wildcard character;
generate a first array containing each element of the selected wildcard token separated by the wildcard character,
wherein the first array includes a first character and a last character;

generate a second array containing each element in a comparison wildcard token separated by the wildcard character, wherein the second array includes a beginning element and an end element;

determine that each element in the first array is contained in the second array;

determine that the selected wildcard token does not begin with the wildcard character;

determine that the first character of the first array is a same as the beginning element of the second array;

determine that the last e character of the first array is a same as the end element of the second array; and remove the selected wildcard token from the set of wildcard tokens.

14. The system of claim 11, wherein any string that matches the first wildcard token also matched the first word token, includes each element in the string contained in the first word token, a first element of the string matches a first element of the first word token if the first wildcard token does not begin with the wildcard character and a last element of the string matches a last element of the first word token if the first wildcard token does not end with the wildcard character.

15. A non-transitory machine-readable storage medium encoded with instructions, the instructions being executable by a hardware processor of a system for electronically removing keywords from a list of keywords in a search expression for retrieving documents stored electronically from a database to cause the hardware processor to:

separate the list of keywords into a set of word tokens and a set of wildcard tokens, wherein each wildcard token contains a wildcard character and one or more word characters and each word token contains one or more word characters and no wildcard character;

remove each wildcard token in the set of wildcard tokens that is inferred by at least one word token in the set of word tokens;

remove each wildcard token in the set of wildcard tokens that is inferred by at least one other wildcard token in the set of wildcard tokens, wherein removing each wildcard token in the set of wildcard tokens that is inferred by at least one word token in the set of word tokens and removing each wildcard token in the set of wildcard tokens that is inferred by at least one other wildcard token in the set of wildcard tokens removes keywords from the list of keywords;

generate a new list of keywords from the list of keywords separated into the set of word tokens and the set of wildcard tokens including each of the word tokens of the set of word tokens and each wildcard token not removed from the set of wildcard tokens; and execute a search query using the new list of keywords.

16. The non-transitor machine-readable storage medium of claim 15, wherein the instructions being executable by the hardware processor of the system cause the system to:

determine whether a selected wildcard token belonging to the set of wildcard tokens begins with the wildcard character;

determine whether the selected wildcard token ends with the wildcard character;

generate a first array containing each element of the selected wildcard token separated by the wildcard character, wherein the first array includes a first character and a last character;

determine that each element in the first array is contained in a selected word token belonging to the set of word tokens;

determine that the first character of the first array is a first element of the selected word token if the selected wildcard token does not begin with the wildcard character;

determine that the last character of the first array is a last element of the selected word token if the selected wildcard token does not end with the wildcard character; and remove the selected wildcard token from the set of wildcard tokens.

17. The non-transitory machine-readable storage medium of claim 15, wherein the instructions being executable by the hardware processor of the system cause the system to:

determine whether a selected wildcard token belonging to the set of wildcard tokens begins with a wildcard character;

determine whether the selected wildcard token ends with the wildcard character;

generate a first array containing each element of the selected wildcard token separated by the wildcard character, wherein the first array includes a first character and a last character;

generate a second array containing each element in a comparison wildcard token separated by the wildcard character, wherein the comparison wildcard token belongs to the set of wildcard tokens and the second array includes a beginning element and an end element;

determine that each element in the first array is contained in the second array;

determine whether the selected wildcard token begins with the wildcard character, if the comparison wildcard token begins with the wildcard character, and if the comparison wildcard token does not begin with the wildcard character, determine that the first character of the first array is a same as the beginning element of the second array; and determine whether the selected wildcard token ends with a wildcard character, if the comparison wildcard token ends with the wildcard character, and if the comparison wildcard token does not end with the wildcard character, determine that the last character of the first array is a same as the end element of the second array.

18. The non-transitory machine-readable storage medium of claim 15, wherein the list of keywords is included in the search query and the new list of keywords is generated before execution of the search query.

19. The non-transitory machine-readable storage medium of claim 15, wherein each wildcard token is inferred by a word token if each element of a string representing the wildcard token is contained in the word token, a first element of the string matches a first element of the word token if the wildcard token does not begin with the wildcard character and a last element of the string matches a last element of the word token if the wildcard token does not end with the wildcard character.

20. The on-transitory machine-readable storage medium of claim 15, wherein each wildcard token is inferred by the at least one other wildcard token if each element of a string representing the wildcard token is contained in a string representing the at least one other wildcard token, the wildcard token and the at least one other wildcard token begin with the wildcard character, the wildcard token and the at least one other wildcard token end with the wildcard character, a first element of the string of the wildcard token matches a first element of the string of the at least one other wildcard token if the wildcard token does not begin with the wildcard character and a last element of the string of the wildcard token matches a last element of the string of the at least one other wildcard token if the wildcard token does not end with the wildcard character.

* * * * *